United States Patent [19]

Carter et al.

[11] Patent Number: 5,666,267

[45] Date of Patent: Sep. 9, 1997

[54] FRONT PANEL AUDIO I/O APPARATUS FOR PERSONAL COMPUTER SYSTEMS

[75] Inventors: Bill W. Carter, Portland; Scott L. Noble, Beaverton, both of Oreg.

[73] Assignee: Intel Corporation, Santa Clara, Calif.

[21] Appl. No.: 359,280

[22] Filed: Dec. 19, 1994

[51] Int. Cl.⁶ .................................................. H05K 5/00
[52] U.S. Cl. .................... 361/686; 361/683; 361/685; 361/627; 361/633
[58] Field of Search ............................ 361/683, 685, 361/686, 627, 633

[56] References Cited

U.S. PATENT DOCUMENTS

| | | | |
|---|---|---|---|
| 5,020,926 | 6/1991 | Wilhelm | 400/54 |
| 5,050,041 | 9/1991 | Shafi | 361/686 |
| 5,513,068 | 4/1996 | Girand | 361/685 |

Primary Examiner—Kenneth S. Kim
Attorney, Agent, or Firm—Blakley, Sokoloff, Taylor & Zafman

[57] ABSTRACT

An audio I/O connector, a flex cable, an audio I/O extension card, a mounting bracket, and a besel, designed to couple and complement each other in a particular geometrical manner, are provided to conduct I/O of audio signals at the front panel area of a Baby-AT/LPX and the like system unit previously sealing the hard drive bay. The audio I/O connector reorients an otherwise conventional audio add-in/adapter card to conduct I/O of audio signals through the frontal portion of the Baby-AT/LPX and the like system unit. The flex cable transports the audio I/O signals to and from the front and back portions of the Baby-AT/LPX and the like system unit. The audio I/O extension card facilities conduct of audio I/O with external audio devices at the front panel, the aforementioned area in particular. The mounting bracket secures the audio I/O extension card to the hard drive bay. The besel exposes audio I/O ports of the audio I/O extension card at the front panel area of interest.

18 Claims, 11 Drawing Sheets

LPX DRIVE BAY WITH AUDIO (IR) MODULE INSTALLED

FRONT PANEL AUDIO I/O APPARATUS FOR PERSONAL COMPUTER SYSTEMS

BACKGROUND OF THE INVENTION

1. Field of the Invention

The present invention relates to the field of computer systems. More specifically, the present invention relates to audio input/output (I/O) of personal computer systems.

2. Background Information

Keeping manufacturing cost low is an essential part of maintaining competitiveness in price/performance for personal computer system manufacturers. Ensuring physical as well as functional compatibility among like components supplied by different supply vendors is a critical factor in keeping manufacturing cost low. Thus, over the years, a small number of packaging form factor standards for packaging system units of personal computers have emerged as the most popular packaging form factor standards. The overwhelming majority of personal computer systems today are manufactured in accordance to these form factor standards.

Particular examples of these packaging form factor standards are the so called Baby AT and the Low Profile or LPX form factor standards. The Baby-AT and LPX form factor standards, like other packaging form factor standards, include specifications for various physical aspects of a standard conforming computer system unit. In particular, the standard specifies the size of the motherboard, and its orientation. The standard further specifies where the expansion slots are to be located on the motherboard, and where the corresponding access cutouts are to be located on the back panel of the system unit. The standard also specifies the sizes, the frontal locations, and the orientations of the hard drives, the 3.5 drives, and their drive bays.

Among the functions that typically use the expansion slots and their corresponding access cutouts is the audio function. Traditionally, audio support for personal computers has been provided through audio add-in cards. For personal computers whose system units are packaged in accordance to the Baby-AT/LPX form factor standard or the like, these audio add-in cards are located in the specified expansion slots, and I/O of audio signals to/from the audio add-in cards are conducted through audio ports located at the corresponding back panel access cutouts.

As the technology of integration continues to advance, more and more functions that are traditionally provided by add-in cards are being integrated onto the motherboard, including audio function provided by audio add-in card. However, because of the limitations imposed by the Baby-AT/LPX form factor standard and the like, typically I/O of audio signals are still conducted through audio ports located at one of the add-in card access cutouts of the back panel of a computer system.

This prior art manner of conducting I/O of audio signals has a critical disadvantage in that it is difficult to couple audio jacks to the audio ports at the back panel. This disadvantage is especially aggravating for the relatively more novice users of home multi-media computer systems. Thus, it is desirable to be able to conduct I/O of audio signals in a much more user friendly manner, but still be able to continue to meet the packaging form factor standards with minimal increases, if any, on the manufacturing cost. More specifically, it is desirable to be able to conduct I/O of audio signals at the front panel of a Baby-AT/LPX and the like system unit, but at the same time still fully complies with the governing form factor standard. As will be disclosed in more details below, the present invention provides for such a audio output apparatus that achieves these and other desired results.

SUMMARY OF THE INVENTION

The desired results are advantageously achieved by providing an audio I/O apparatus comprising an audio I/O connector, a flex cable, an audio I/O extension card, a mounting bracket, and a besel. The audio I/O connector reorients an otherwise conventional audio add-in/adapter card to conduct I/O of audio signals through the frontal portion of a Baby-AT/LPX and the like system unit. The flex cable transports the audio I/O signals to and from the front and back portions of the Baby-AT/LPX and the like system unit. The audio I/O extension card facilities conduct of audio I/O with external audio devices at the front panel of the Baby-AT/LPX and the like system unit, in particular the front panel area previously sealing the hard drive bay of the Baby-AT/LPX and the like system unit. The mounting bracket secures the audio I/O extension card to the hard drive bay. The besel exposes audio I/O ports of the audio I/O extension card at the front panel area of interest.

The audio I/O connector inputs/outputs audio signals to and from the audio add-in/adapter card. The audio I/O connector is disposed on an inner edge of the conventionally located audio add-in/adapter card, and oriented towards the front panel of the Baby-AT/LPX and the like system unit. The flex cable couples the audio I/O signals to/from the audio I/O connector and the audio I/O extension card, passing through the gap formed by the hard drive and the 3.5" drive of the Baby-AT/LPX and the like system unit. The flex cable includes two audio I/O connectors of its own, one mates with the forward oriented audio I/O connector of the audio add-in/adapter card at one end while the other mates with yet another audio I/O connector of the audio I/O extension card at the other end.

The audio I/O extension card exchanges audio I/O signals with the audio add-in/adapter card on one side, and with external audio devices on the other side. In addition to the above mentioned audio I/O connector for mating with the terminating audio I/O connector of the flex cable, the audio I/O extension card further comprises a number of audio ports for coupling audio I/O signals with external audio devices, and embedded circuitry for routing audio I/O signals from its audio I/O connector to the audio ports. The audio I/O extension card is dimensioned to fit in the frontal portion of the hard drive bay, occupying a small fraction of the space therein, without intruding into the conventional space required by the hard drive. The audio I/O connector mating with the terminating audio I/O connector of the flex cable is disposed at an inner edge of the audio I/O extension card, whereas the audio ports are disposed at an outer edge of the audio I/O extension card.

The mounting bracket mounts the audio I/O extension card to the hard drive bay of a Baby-AT and the like system unit in a vertical manner, whereas the mounting bracket mounts the audio I/O extension card to the hard drive bay of a LPX and the like system unit in a horizontal manner. In like manner, the besel exposes the audio ports at the front panel of a Baby-AT and the like system unit in a vertical manner, whereas the besel expose the audio ports of a LPX and the like system unit in a horizontal manner. In either case, the surface area of the front panel previously sealing the hard drive bay is cut away.

Additionally, the audio I/O extension card is preferably further provided with a knob for controlling audio volume. The besel is further adapted to expose and cap the knob. In one embodiment, the audio I/O extension card is further provided with a switch for muting audio output signals. The besel is further adapted to expose and cap the mute switch.

In one embodiment, the audio I/O extension card is further provided With infrared (IR) sensors disposed at the outer edge for sensing IR signals of remote control commands from a remote control device and converting the IR signals into electrical signals, additional embedded circuitry for routing the electrical signals to the inner edge, and additional cables for coupling the electrical signals to an add-in card or the motherboard. The besel is further adapted with a transparent area to allow the IR signals to pass through.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention will be described using an exemplary Baby-AT and an exemplary LPX system unit. However, it will be appreciated by those skilled in the art that the present invention may be practiced in other system units having the physical characteristics advantageously exploited by the present invention, including but not limited to mini-tower as well as regular tower system units. In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
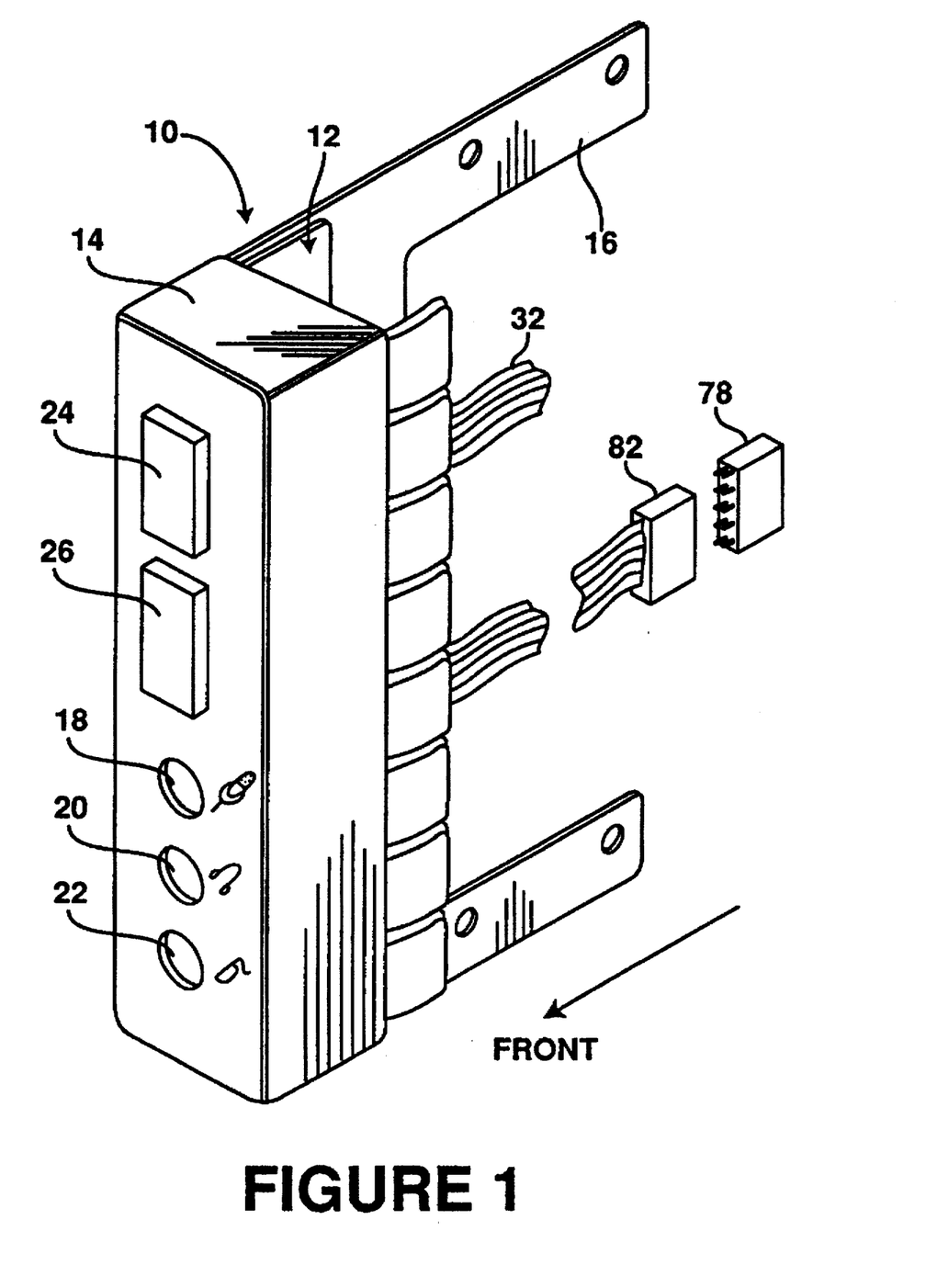
FIG. 1 is a perspective view of the audio I/O apparatus of the present invention.
Figure 2:
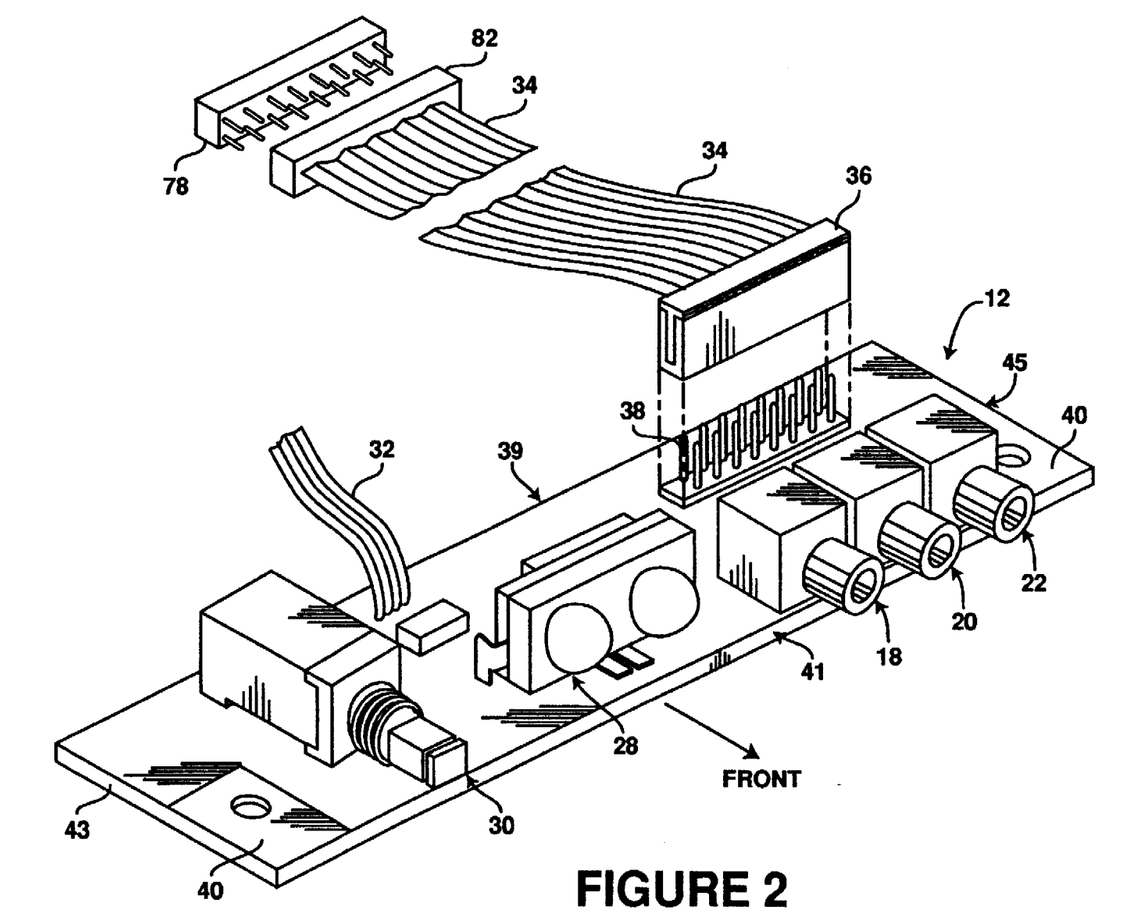
FIG. 2 is an exposed view of the audio I/O apparatus of the present invention with the mounting bracket and the besel.
Figure 7:
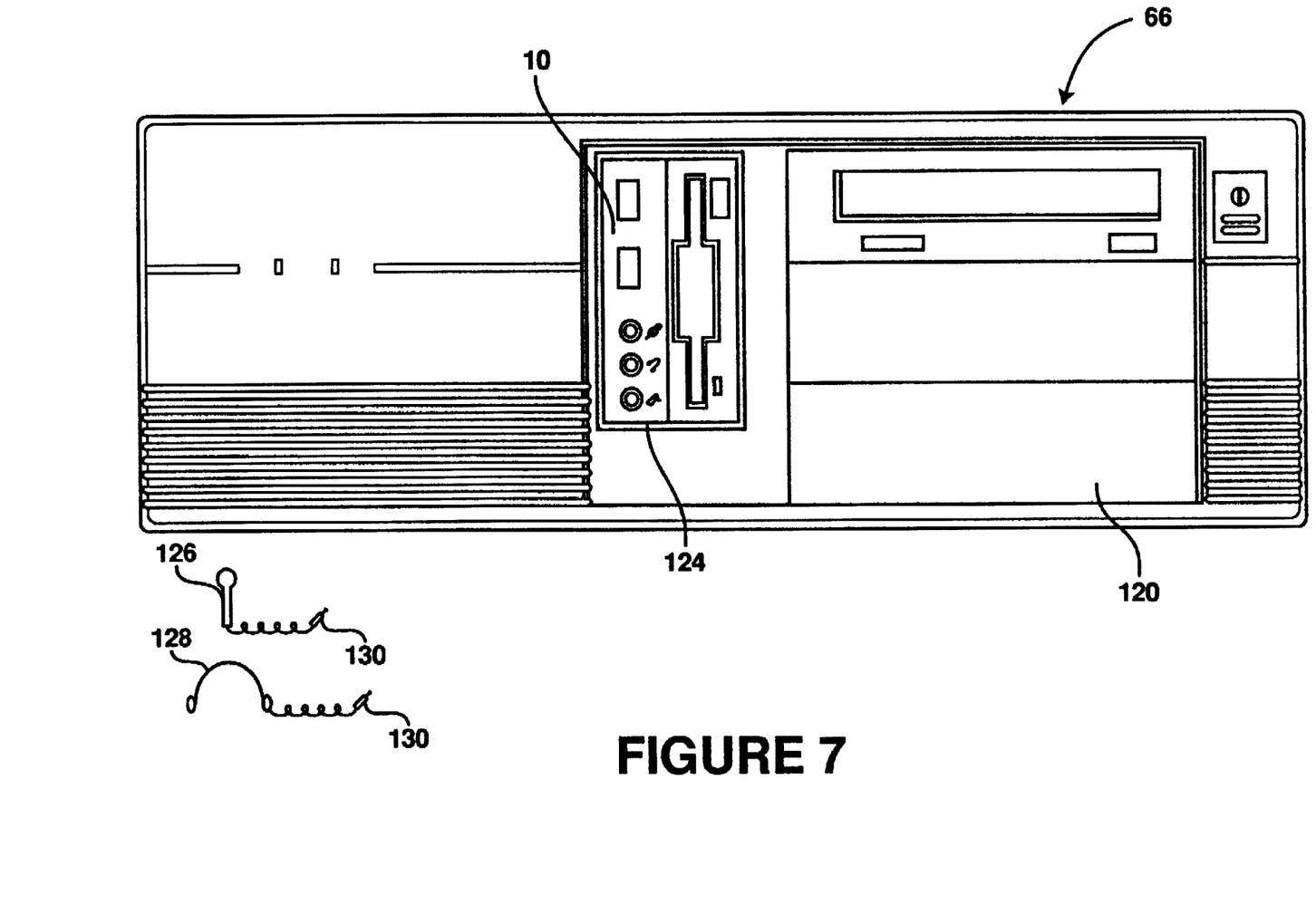
FIG. 7–8 are front view respectively of a Baby-AT and of a LPX system unit having the audio I/O apparatus of the present invention installed.
Figure 8:
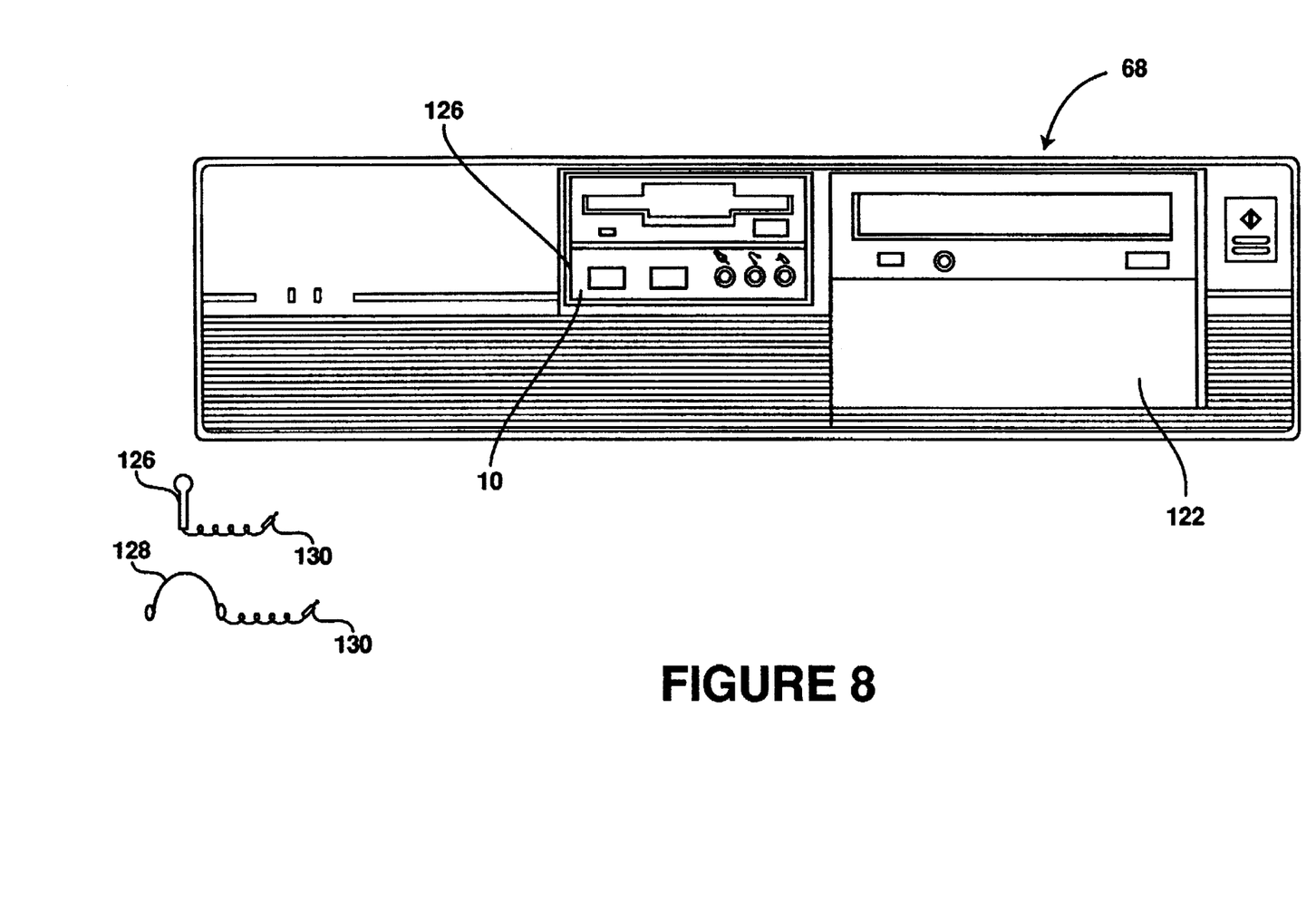

Referring now primarily to FIGS. 1–2, and secondarily to FIGS. 7–8, enclosed and exposed perspective views of audio I/O apparatus 10 of the present invention, and front views of a Baby-AT and a LPX system unit are shown respectively. As illustrated, audio I/O apparatus 10 in accordance to the present invention, comprises an audio I/O connector 78, flex cable 34, audio I/O extension card 12, mounting bracket 16, and besel 14. Audio I/O connector 78 reorients an otherwise conventional audio add-in/adapter card (70 and 92 in FIGS. 9–10) to conduct I/O of audio signals through the frontal portion of a Baby-AT/LPX system unit 60 and 68. Flex cable 34 transports audio I/O signals to and from the front and back portions of the Baby-AT/LPX system unit 60 and 68. Audio I/O extension card 12 facilities conduct of audio I/O with external audio devices 126 and 128 at the front panel 120 and 122 of the Baby-AT/LPX system unit 66 and 68, in particular the front panel area 124 and 126 previously sealing the hard drive bay (42 and 48 of FIGS. 3–4) of the Baby-AT/LPX system unit 66 and 68. Mounting bracket 16 secures audio I/O extension card 12 to the hard drive bay wall (46 and 52 of FIGS. 3–4). Besel 14 exposes audio I/O ports 18, 20 and 22 of audio I/O extension card 12 at the front panel area of interest 124 and 126.

Figure 9:
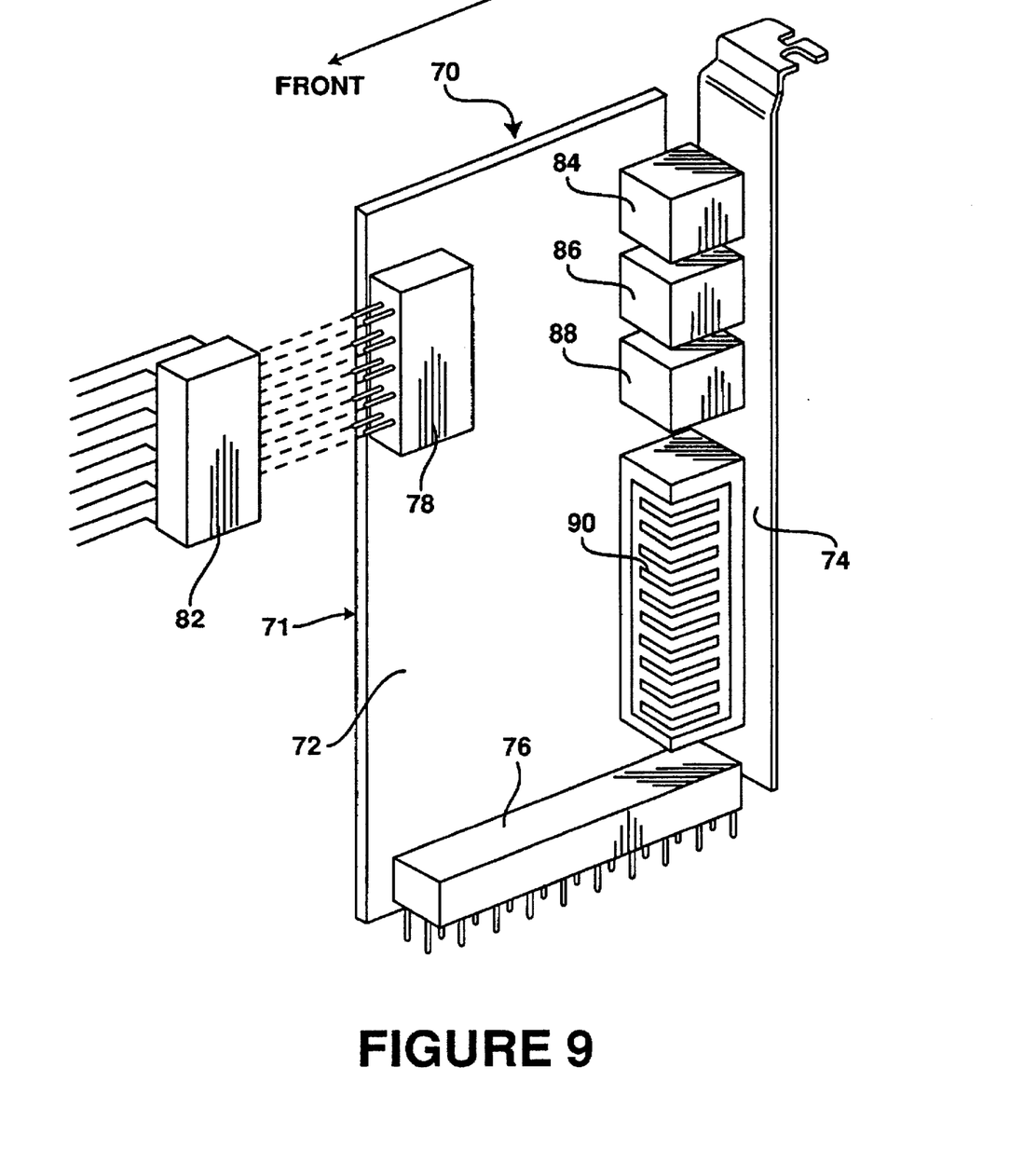
FIGS. 9–10 illustrate disposition of the audio I/O connector of the audio I/O apparatus of the present invention respectively on an exemplary Baby-AT and on an exemplary LPX audio adapter card.
Figure 10:
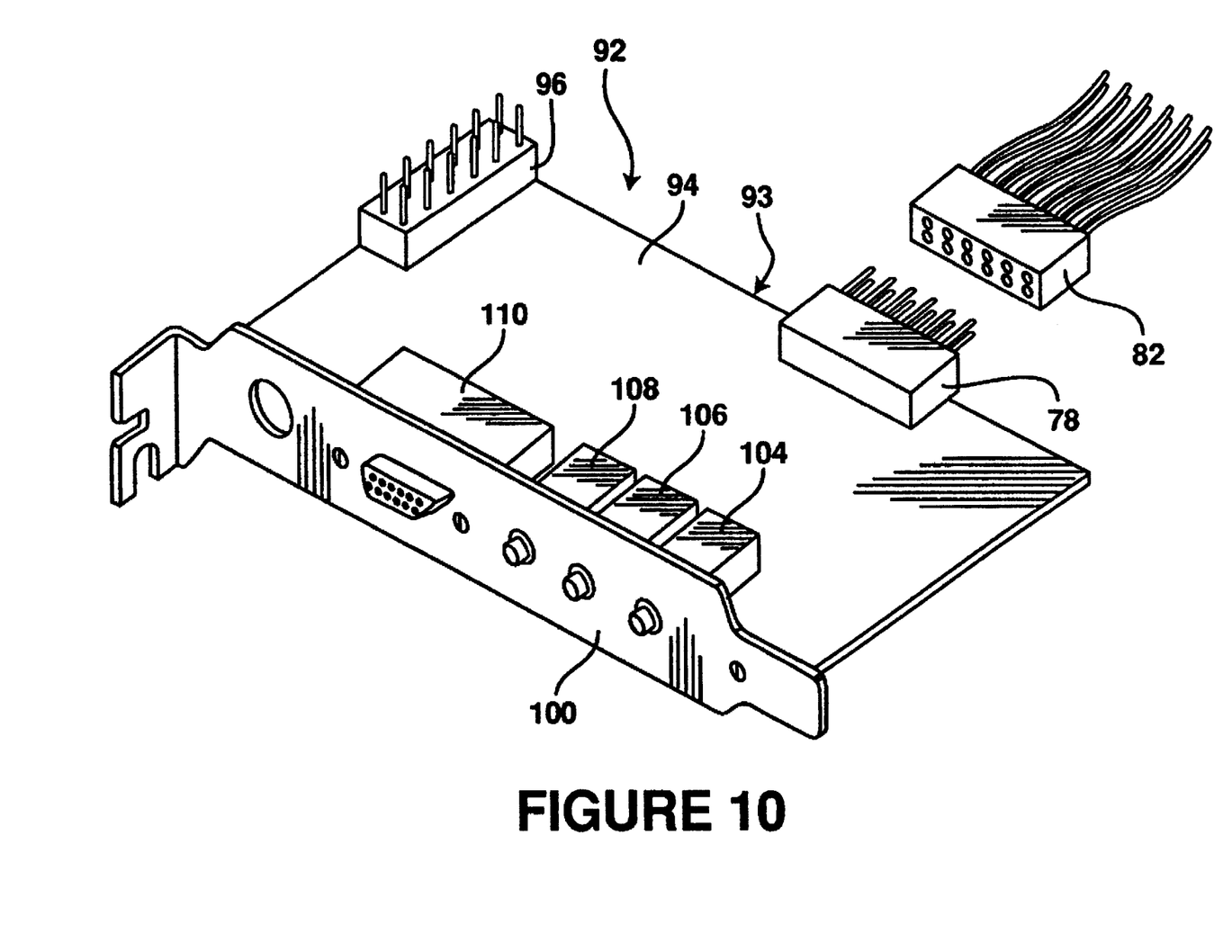
Figure 11:
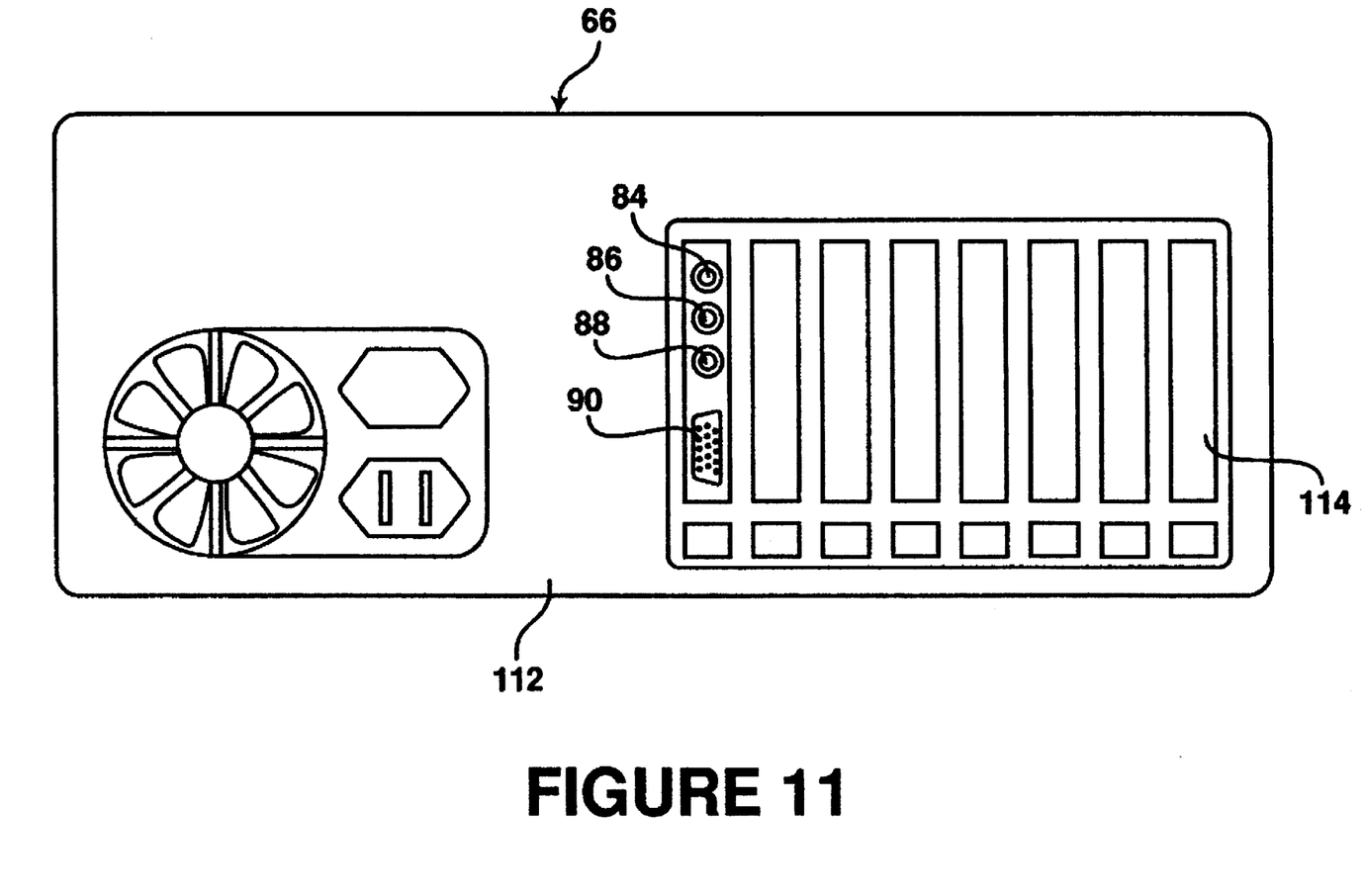
FIGS. 11–12 are rear views respectively of a Baby-AT and of a LPX system unit.
Figure 12:
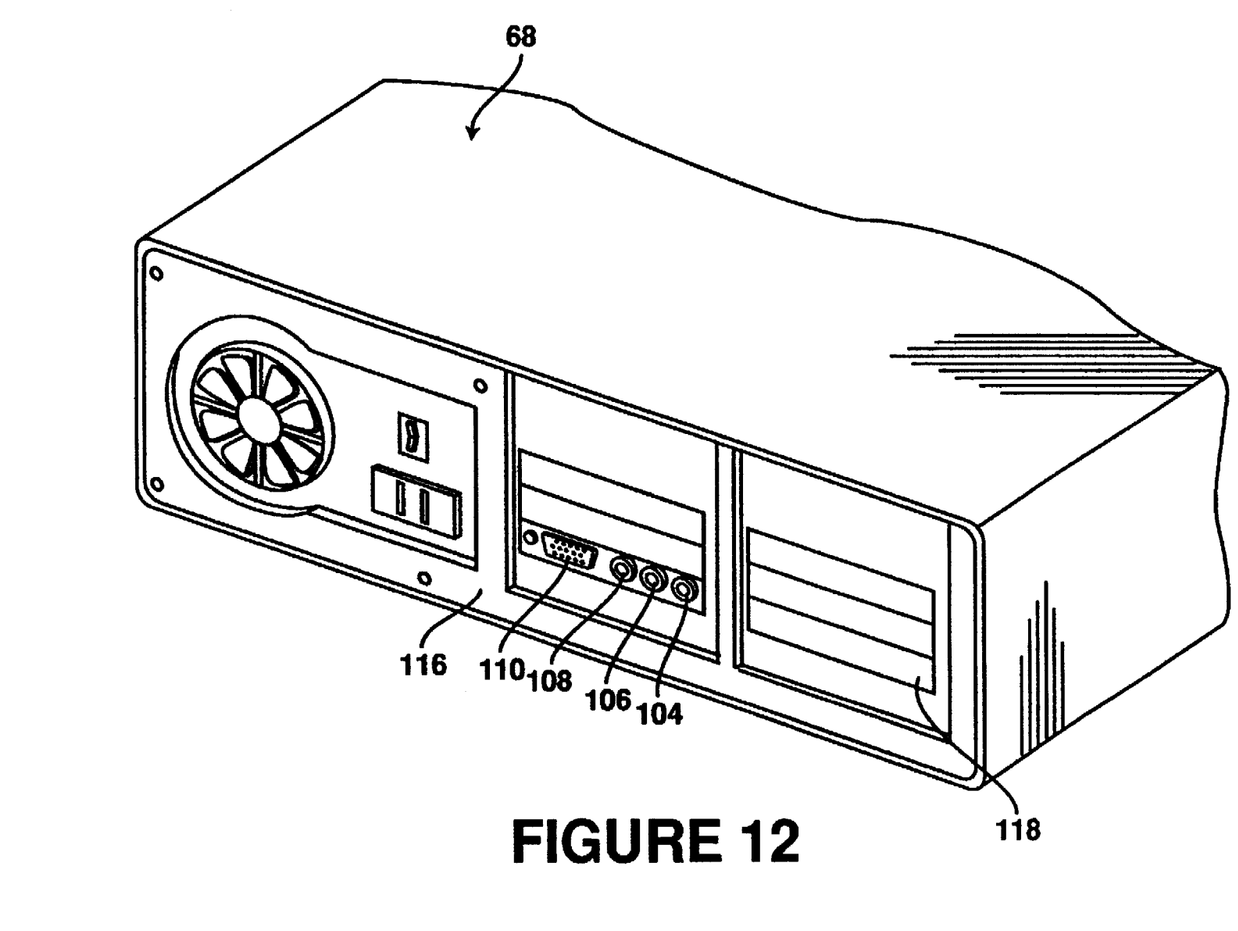

Referring now primarily to FIGS. 9–10, and secondarily to FIGS. 11–12, a perspective view of an exemplary Baby-AT audio adapter card 70, a perspective view of an exemplary LPX audio adapter card 92, a rear view of a Baby-AT system unit 66, and a rear view of a LPX system unit 68 are shown respectively. As illustrated, exemplary Baby-AT/LPX audio adapter card 70 or 92 comprises conventional elements such as circuit board 72 or 94, connector 76 or 96, audio ports 84–88 or 104–108, game port 90 or 110, and mounting bracket 74 or 100. Connector 76 or 96 exchanges audio I/O signals with the motherboard (not shown), and audio ports 84–88 or 104–108 exchange audio I/O signals with external audio devices (126 and 128 of FIGS. 7–8). Mounting bracket 74 or 100 mounts Baby-AT/LPX audio adapter card 70 or 92 to one of the add-in card access cutouts 114 or 118 of the rear panel 112 or 116, exposing the audio ports 84–88 or 104–108 to the external audio devices (126 and 128 of FIGS. 7–8) through rear panel 112 or 116.

However, in accordance to the present invention, otherwise conventional exemplary audio add-in/adapter card 70 or 92 further comprises audio I/O connector 78 for providing an alternative/additional reoriented channel to conduct I/O of audio signals through the frontal portion of a Baby-AT/LPX system unit 66 and 68. Audio I/O connector 78 inputs/outputs audio signals to and from the audio add-in/ adapter card 70 or 92. Audio I/O connector 70 or 92 is disposed on an inner edge 71 or 93 of the conventionally located audio add-in/adapter card 70 or 92, and oriented towards the front panel (120 or 122 of FIGS. 7 and 8) of the Baby-AT/LPX system unit 66 or 68. Audio I/O connector 78 may be implemented with any number of audio I/O connectors known in the art.

Referring now primarily to FIGS. 1–2, and secondarily to FIGS. 7–8 again, flex cable 34 transports audio I/O signals to and from the front and back portions of Baby-AT/LPX system unit 66 or 68. Flex cable 34 includes two audio I/O connectors 36 and 82 of its own, one mates with the forward oriented audio I/O connector 78 at one end, while the other mates with yet another audio I/O connector 38 of audio I/O extension card 12 at the other end.

Figure 5:
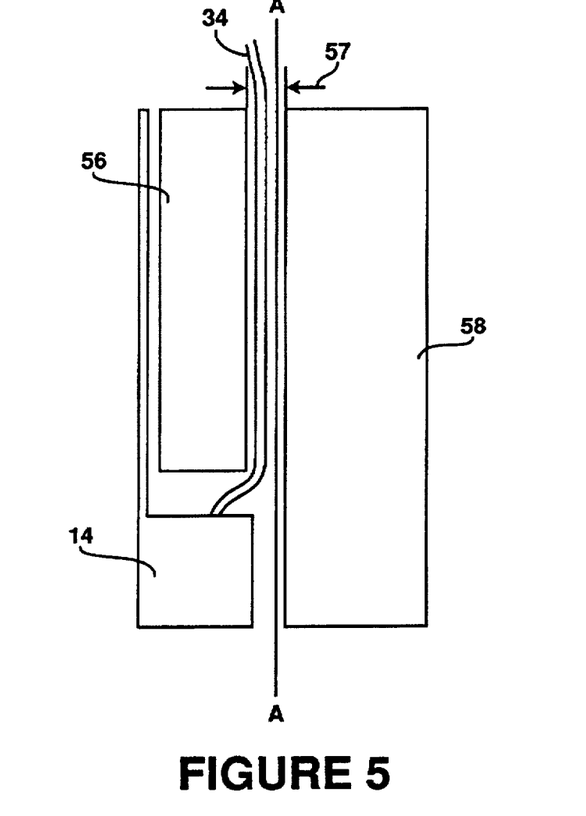
FIGS. 5–6 are sectional views of the audio I/O apparatus of the present invention installed in hard drive bay respectively of a Baby-AT of and of LPX system unit.
Figure 6:
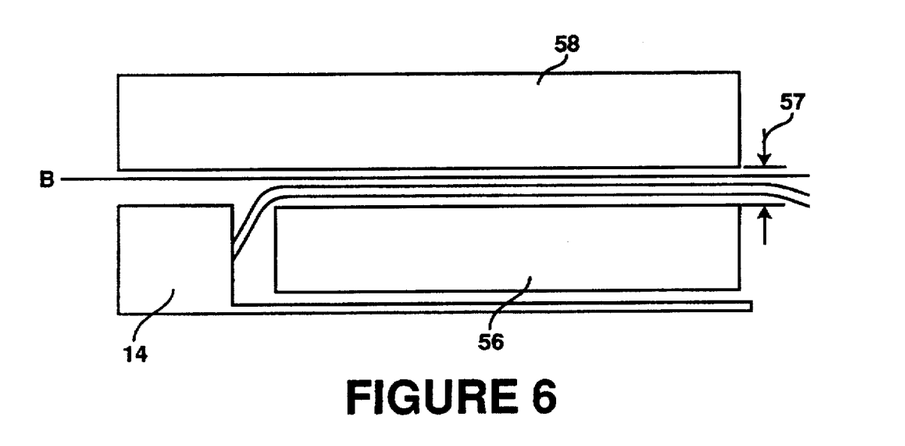

Referring now also to FIGS. 5–6, wherein sectional views of audio I/O apparatus 10 installed into the hard drive bay 42 and 48 of a Baby-AT and a LPX system trait 66 and 68 are shown, flex cable 34 is thin and flexible. Furthermore, flex cable 34 advantageously couples audio I/O signals audio I/O single to/from audio I/O connector 78 and audio I/O extension card 12, passing through the gap 57 formed by hard drive 56 and the 3.5" drive 58 of the Baby-AT/LPX system unit 66 or 68.

Continuing now to refer primarily to FIGS. 1–2, and secondarily to FIGS. 7–8, audio I/O extension card 12 facilities conduct of audio I/O with external audio devices 126 and 128 at the front panel 120 and 122 of the Baby-AT/LPX system unit 66 and 68, in particular the front panel area 124 and 126 previously sealing the hard drive bay (44 and 50 of FIGS. 3 and 4) of the Baby-AT/LPX system unit 66 and 68. Audio I/O extension card 12 exchanges audio I/O signals with the audio add-in/adapter card (70 and 92 of FIGS. 9 and 10) on one side, and with external audio devices 126 and 128 on the other side. In addition to audio I/O connector 38 for mating with terminating audio I/O connector 36 of flex cable 34, audio I/O extension card 12 further comprises a number of audio ports 18, 20 and 22 for coupling audio I/O signals with external audio devices 126 and 128, and embedded circuitry (not shown) for routing audio I/O signals from audio I/O connector 38 to audio ports 18, 20 and 22. In one embodiment, audio I/O ports 18, 20 and 22 include a microphone input port 18, a headphone output port 20 and an audio input port 22 for importing audio input signals from an external audio source such as a cassette tape.

Figure 3:
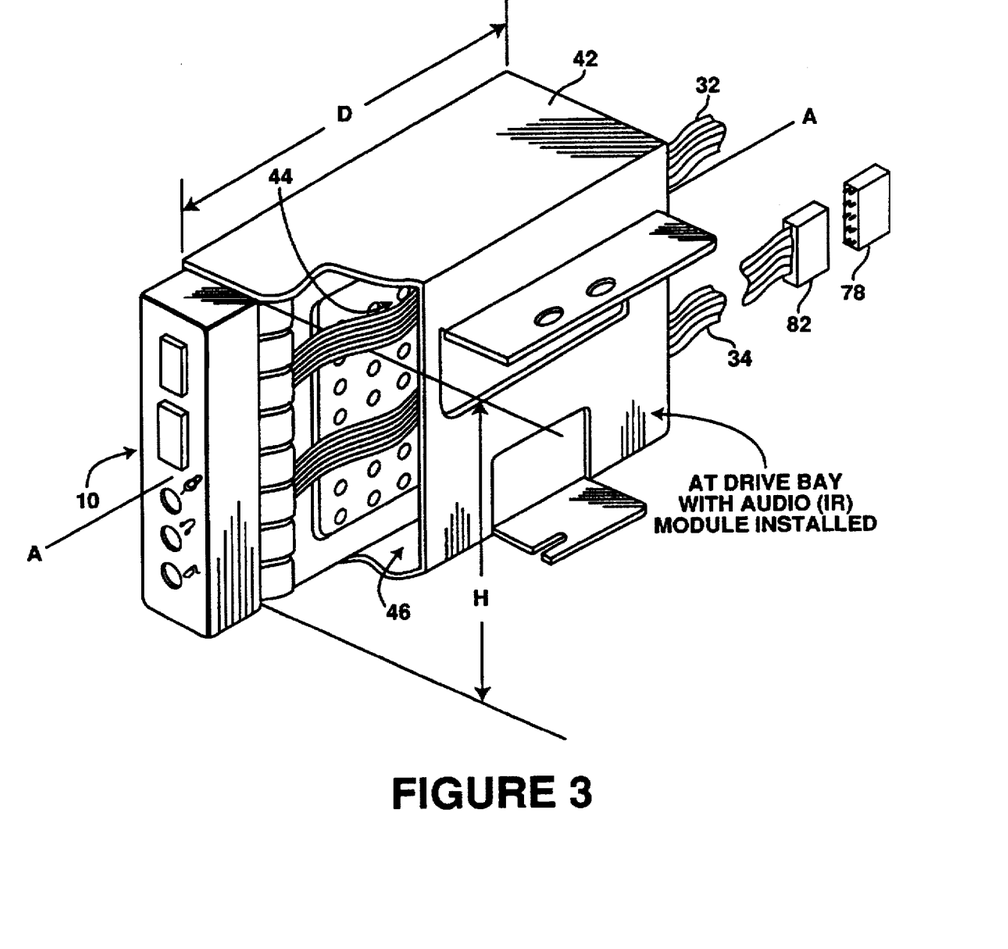
FIGS. 3–4 are perspective views of the audio I/O apparatus of the present invention installed in the hard drive bay respectively of a Baby-AT and of a LPX system unit.
Figure 4:
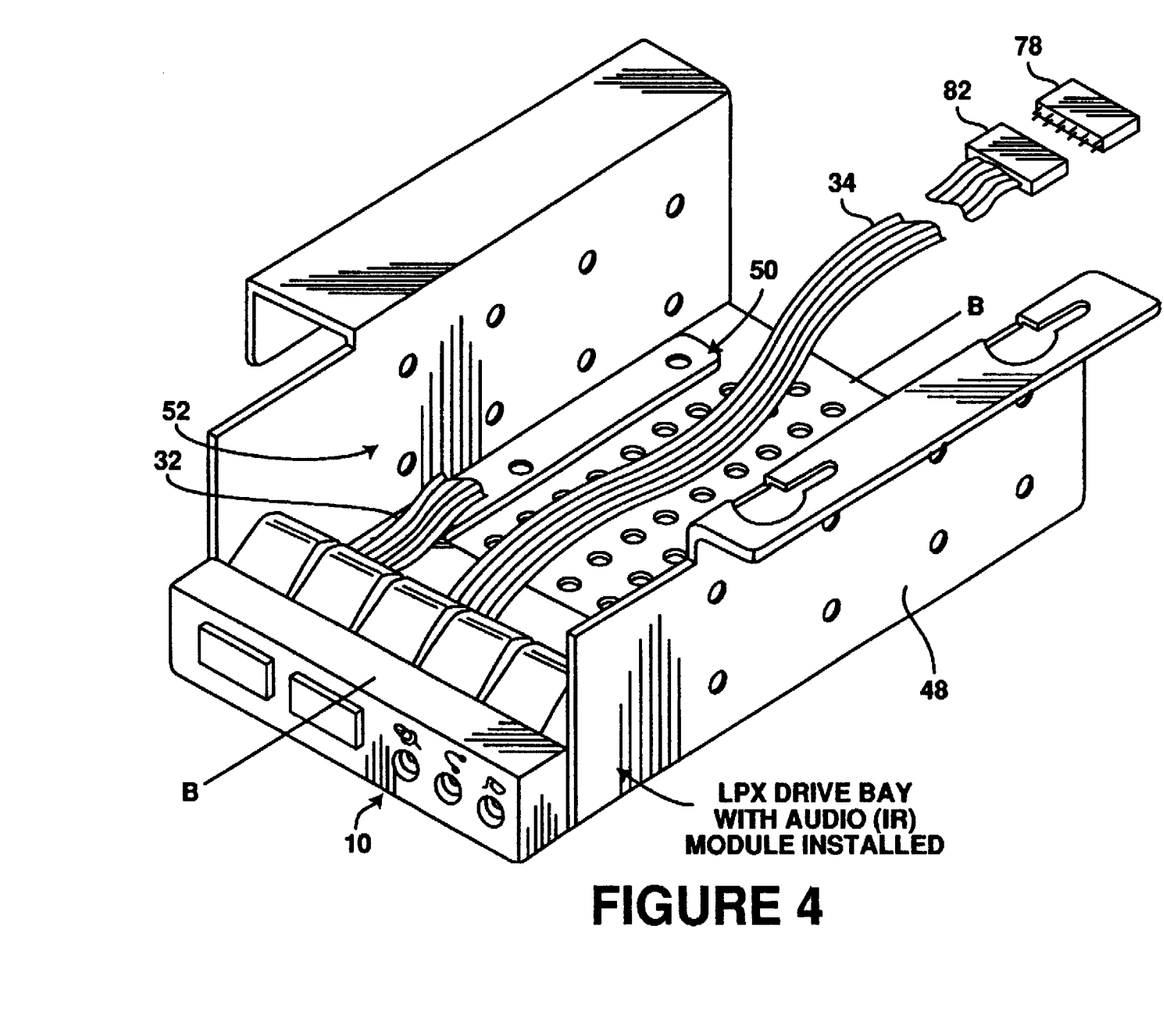

Referring now briefly to FIGS. 3–4 also, wherein perspective views of audio I/O apparatus 10 installed in the hard drive bay 42 or 48 of a Baby-AT/LPX system unit 66 or 68, audio I/O connector 38 is disposed at an inner edge 39 of audio I/O extension card 12, whereas the audio ports 18, 20 and 22 are disposed at an outer edge 41 of audio I/O extension card 12. Audio I/O extension card is dimensioned to fit in the frontal portion of hard drive bay 42 or 48, occupying a small fraction of the space therein, without intruding into the conventional space required by the hard drive (56 of FIGS. 5–6). More specifically, the dimension of inner/outer edge 39 or 41 is smaller than height (H)/width (W) of hard drive bay 42 or 48. Furthermore, the dimension of side edge 43 or 45 is small, such that audio I/O extension card 12 intrudes minimally on depth (D) of hard drive bay 42 or 48.

Referring now primarily to FIGS. 1–2 again, mounting bracket 16 secures audio I/O extension card 12 to hard drive bay (42 of FIG. 3) of Baby-AT system unit (66 of FIG. 7) in a vertical manner, whereas mounting bracket 16 mounts audio I/O extension card 12 to hard drive bay (48 of FIG. 4) of LPX system unit (68 of FIG. 8) in a horizontal manner. Mounting bracket 16 is advantageously U-shaped and having a small thickness, thereby minimizing intrusion into the conventional space required by hard drive (56 of FIGS. 5–6).

In like manner, besel 14 exposes audio ports 18, 20 and 22 at front panel (120 of FIG. 7) of a Baby-AT system unit (66 of FIG. 7) in a vertical manner, whereas besel 14 exposes audio ports 18, 20 and 22 at front panel (122 of FIG. 8) of a LPX system unit (68 of FIG. 8) in a horizontal manner. Besel 14 is box shaped having a hollowed interior dimensioned to accommodate audio I/O card 12. In either case, the surface area (124 or 126 of FIGS. 7–8) of front panel (120 or 122 of FIGS. 7–8) previously sealing the hard drive bay (42 or 48 of FIGS. 3–4) is cut away.

Continuing to refer primarily to FIGS. 1–2, in addition to the novel features described above, audio I/O extension card 12 is preferably further provided with a knob 30 for controlling audio volume. Knob 30 is disposed near outer edge 41. Besel 14 is further adapted to expose and cap 24 knob 30. In like manner, audio I/O extension card 12 may further be provided with a switch (not shown) for muting audio output signals. Mute switch would be similarly disposed near outer edge 41. Besel 14 is further adapted to expose and cap mute switch.

Furthermore, in one embodiment, audio I/O extension card 12 is further provided with infrared (IR) sensors 28 disposed at the outer edge 41 for sensing IR signals of remote control commands from a remote control device (not shown) and converting the IR signals into electrical signals, additional embedded circuitry (not shown) for routing the electrical signals to the inner edge 39, and additional cables 32 for coupling the electrical signals to an add-in card or the motherboard (neither shown). In like manner, besel 14 is further adapted with a transparent area 26 to allow the IR signals to pass through to IR sensors 28.

Thus, an audio I/O apparatus for conducting audio I/O at the front panel of a Baby-AT/LPX and the like system unit of a computer system has been described. While the apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An audio input/output (I/O) module comprising:

a) an audio I/O extension card having a first audio I/O connector disposed at an inner edge of the audio I/O extension card for exchanging audio I/O signals with a conventional back portion located audio add-in/adapter card of a system unit, embedded circuitry for routing the audio I/O signals from the inner edge to the outer edge of the audio I/O extension card, a plurality of audio ports disposed at the outer edge of the audio I/O extension card for exchanging the audio I/O signals with audio devices external to the system unit, the audio I/O extension card being shaped and dimensioned to coexist with a hard drive in a hard drive bay of the system unit without intruding into a conventional space of the hard drive bay reserved to permit a hard drive to be installed into the conventional space of the hard drive bay;

b) a mounting bracket for mounting the audio I/O extension card to the hard drive bay, the mounting bracket being shaped and dimensioned to fit into a front portion of the hard drive bay of the system unit without intruding into the conventional space of the hard drive bay reserved to permit a hard drive to be installed into the conventional space of the hard drive bay; and c) a besel having a plurality of cutouts for covering the audio I/O extension card, while exposing the audio ports at a front panel area of the system unit previously sealing the hard drive bay, the besel being dimensioned in a complementary manner to the audio I/O extension card.

2. The audio I/O module as set forth in claim 1, wherein the audio I/O card is rectangular in shape; the inner and outer edges being the longer sides of the rectangular audio I/O cards and having a dimension shorter than a height/width of the hard drive bay; and the short sides of the rectangular audio I/O cards having a dimension sufficiently short such that the audio I/O extension card intrudes minimally into a depth of the hard drive bay.

3. The audio I/O module as set forth in claim 1, wherein the mounting bracket is substantially U-shaped having a thickness sufficiently thin such that the mounting bracket intrudes minimally into the conventional space of the hard drive bay required by the hard drive.

4. The audio I/O module as set forth in claim 1, wherein the besel is substantially box-shaped having a hollowed interior dimensioned to accommodate the audio I/O extension card such that the besel intrudes minimally in the conventional space of the hard drive bay required by the hard drive.

5. The audio I/O module as set forth in claim 1, wherein the audio I/O extension card further comprises a knob for controlling audio volume, which is also exposed at the front panel of the system unit by one of the cutouts of besel.

6. The audio I/O module as set forth in claim 1, wherein the audio I/O extension card further comprises an infrared (IR) sensor for sensing IR signals of remote control commands and converting the IR signals to electrical signals; and the besel further comprises a transparent window to allow the IR signals to pass through to the IR sensor.

7. An audio input/output (I/O) apparatus comprising:

a) a first audio I/O connector for reorienting a conventional back portion located audio add-in/adapter card to exchange audio I/O signals in a forward direction towards a front panel of a system unit;

b) a flex cable coupled to the first audio I/O connector for coupling the audio I/O signals to a front portion of the hard drive bay of the system unit, the flex cable being shaped and dimensioned to fit through a gap formed between a hard drive and a diskette drive of the system unit;

c) an audio I/O extension card having a second audio I/O connector disposed at an inner edge of the audio I/O extension card for mating with the flex cable and exchanging the audio I/O signals with the flex cable, embedded circuitry for routing the audio signals from the inner edge to an outer edge of the audio I/O extension card, a plurality of audio ports disposed at the outer edge of the audio I/O extension card for exchanging audio I/O signals with audio devices external to the system unit, the audio I/O extension card being shaped and dimensioned to fit into a front portion of a hard drive bay without intruding into a conventional space of the hard drive bay reserved to permit the hard drive to be installed into the hard drive bay;

d) a mounting bracket for mounting the audio I/O extension card to the hard drive bay, the mounting being shaped and dimensioned to fit into the hard drive bay of the system unit without intruding into the conventional space of the hard drive bay required by the hard drive; and e) a besel having a plurality of cutouts for exposing the audio ports at a front panel area of the system unit previously sealing the hard drive bay, the besel being dimensioned in a complementary manner to the audio I/O extension card.

8. The audio I/O apparatus as set forth in claim 7, wherein the audio I/O card is rectangular in shape;

the inner and outer edges being the longer sides of the rectangular audio I/O cards and having a dimension shorter than a height/width of the hard drive bay; and the short sides of the rectangular audio I/O cards having a dimension sufficiently short such that the audio I/O extension card intrudes minimally into a depth of the hard drive bay.

9. The audio I/O apparatus as set forth in claim 7, wherein the mounting bracket is substantially U-shaped having a thickness sufficiency thin such that the mounting bracket intrudes minimally into the conventional space of the hard drive bay required by the hard drive.

10. The audio I/O apparatus as set forth in claim 7, wherein the besel is substantially box-shaped having a hollowed interior dimensioned to accommodate the audio I/O extension card such that the besel intrudes minimally in the conventional space of the hard drive bay required by the hard drive.

11. The audio I/O apparatus as set forth in claim 7, wherein the audio I/O extension card further comprises a knob for controlling audio volume, which is also exposed at the front panel of the system unit by one of the cutouts of besel.

12. The audio I/O apparatus as set forth in claim 7, wherein the audio I/O extension card further comprises an infrared (IR) sensor for sensing IR signals of remote control commands and converting the IR signals to electrical signals; and the besel further comprises a transparent window to allow the IR signals to pass through to the IR sensor.

13. A system unit comprising:

a) an audio add-in/adapter card disposed at a back portion of the system unit having a first audio I/O connector for reorienting the audio add-in/adapter card to exchange audio I/O signals through a front panel of the system unit;

b) a drive bay having a hard drive and a diskette drive installed therein spatially adjacent to each other; P1 c) a flex cable coupled to the first audio I/O connector for coupling the audio I/O signals to a front portion of the drive bay, the flexible being shaped and dimensioned to fit through a gap formed between the hard drive and the diskette drive;

d) an audio I/O extension card having a second audio I/O connector disposed at an inner edge of the audio I/O extension card for mating with the flex cable and exchanging the audio I/O signals with the flex cable, embedded circuitry for routing the audio I/O signals from the inner edge to an outer edge of the audio I/O extension card, a plurality of audio ports disposed at the outer edge of the audio I/O extension card for exchanging the audio signals with audio devices external to the system unit, the audio I/O extension card being shaped and dimensioned to fit into the front portion of the drive bay without intruding into a conventional space of the drive bay required by the hard drive;

e) a mounting bracket for mounting the audio I/O extension card to the drive bay, the mounting bracket being shaped and dimensioned to fit into the drive bay without intruding into the conventional space of the drive bay required by the hard drive; and f) a besel having a plurality of cutouts for exposing the audio ports at an area of the front panel previously sealing the drive bay, the besel being dimensioned in a complementary, manner to the audio I/O extension card.

14. The system unit as set forth in claim 13, wherein the system unit is a Baby-AT system unit, and drive bay, audio I/O extension card, mounting bracket as well as besel are disposed in the Baby-AT system unit in a vertical manner.

15. The system unit as set forth in claim 13, wherein the system unit is a LPX system unit, and drive bay, audio I/O extension card, mounting bracket as well as besel are disposed in the LPX system unit in a horizontal manner.

16. A computer system comprising:

a) a system unit including:

a.1) an audio add-in/adapter card disposed at a back portion of the system unit having a first audio I/O connector for reorienting the audio add-in/adapter card to exchange audio I/O signals from a front panel of the system unit;

a.2) a drive bay having a hard drive and a diskette drive installed therein spatially adjacent to each other;

a.3) a flex cable coupled to the first audio I/O connector for coupling the audio I/O signals to a front portion of the drive bay, the flex cable being shaped and dimensioned to fit through a gap formed between the hard drive and the diskette drive;

a.4) an audio I/O extension card having a second audio I/O connector disposed at an inner edge of the audio I/O extension card for mating with the flex cable and exchanging the audio I/O signals with the flex cable, embedded circuitry for routing the audio I/O signals from the inner edge to an outer edge of the audio I/O extension card, and a plurality of audio ports disposed at the outer edge of the audio I/O extension card, the audio I/O extension card being shaped and dimensioned to coexist with the hard drive and the diskette drive within the drive bay without intruding into a conventional drive bay space reserved for the hard drive;

a.5) a mounting bracket for mounting the audio I/O extension card to the drive bay, the mounting bracket being shaped and dimensioned to fit into the drive bay without intruding into the conventional drive bay space reserved for the hard drive; and a.6) a besel having a plurality of cutouts for exposing the audio ports at an area of the front panel previously sealing the drive bay, the besel being dimensioned in a complementary manner to the audio I/O extension card; and b) a plurality of audio devices coupled to the audio I/O ports for exchanging the audio I/O signals with the audio I/O ports.

17. The computer system as set forth in claim 16, wherein the system unit is a Baby-AT system unit, and drive bay, audio I/O extension card, mounting bracket as well as besel are disposed in the Baby-AT system unit in a vertical manner.

18. The computer system as set forth in claim 16, wherein the system unit is a LPX system unit, and drive bay, audio I/O extension card, mounting bracket as well as besel are disposed in the LPX system unit in a horizontal manner.

* * * * *

UNITED STATES PATENT AND TRADEMARK OFFICE
CERTIFICATE OF CORRECTION

PATENT NO.    : 5,666,267
DATED         : September 9, 1997
INVENTOR(S)   : Carter et al.

It is certified that error appears in the above-identified patent and that said Letters Patent is hereby corrected as shown below:

In column 4 at line 61 delete "trait" and insert --unit-- .

In column 4 at lines 63-64 following "signals" and prior to "to" delete "audio I/O single" .

In column 8 at line 30 delete "flexible" and insert --flex cable--.

Col. 8, line 26, delete "P1" and begin new para. at --c)--.

Signed and Sealed this

Fourteenth Day of April, 1998

Attest:

BRUCE LEHMAN

Attesting Officer

Commissioner of Patents and Trademarks